H. R. JAEKEL.
TIME CONTROLLING APPARATUS.
APPLICATION FILED MAY 14, 1912.

1,114,885.

Patented Oct. 27, 1914.
6 SHEETS—SHEET 1.

WITNESSES
G. M. Spring.

INVENTOR
Henry R. Jaekel,
his Attorney

H. R. JAEKEL.
TIME CONTROLLING APPARATUS.
APPLICATION FILED MAY 14, 1912.

1,114,885.

Patented Oct. 27, 1914.
6 SHEETS—SHEET 2.

WITNESSES

INVENTOR

H. R. JAEKEL.
TIME CONTROLLING APPARATUS.
APPLICATION FILED MAY 14, 1912.

1,114,885.

Patented Oct. 27, 1914.
6 SHEETS—SHEET 3.

WITNESSES
G. M. Spring
William _____

INVENTOR
Henry R. Jaekel
by Richard _____
his Attorney

H. R. JAEKEL.
TIME CONTROLLING APPARATUS.
APPLICATION FILED MAY 14, 1912.

1,114,885.

Patented Oct. 27, 1914.

6 SHEETS—SHEET 4.

WITNESSES
G. M. Spring.

INVENTOR
Henry R. Jaekel,
his Attorney

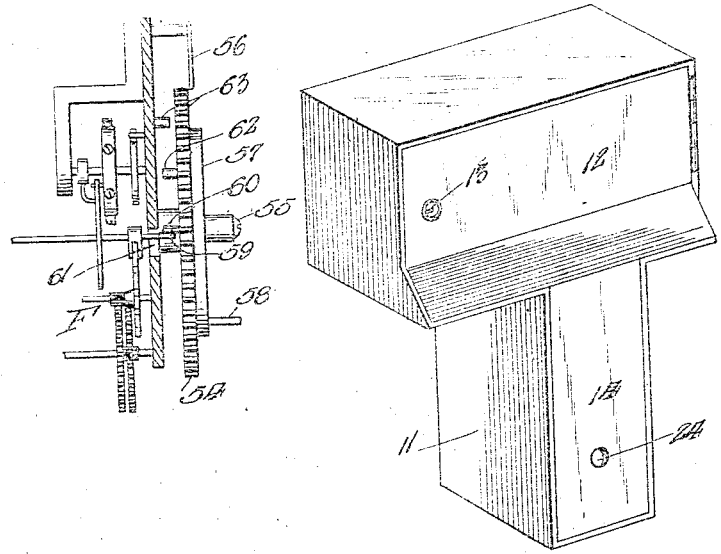

UNITED STATES PATENT OFFICE.

HENRY R. JAEKEL, OF NEW YORK, N. Y.

TIME-CONTROLLING APPARATUS.

1,114,885.

Specification of Letters Patent.   Patented Oct. 27, 1914.

Application filed May 14, 1912.   Serial No. 697,254.

*To all whom it may concern:*

Be it known that I, HENRY R. JAEKEL, a citizen of the United States, residing at New York, in the county of New York and State of New York, have invented new and useful Improvements in Time-Controlling Apparatus, of which the following is a specification.

The present invention relates to new and useful improvements in time controlling apparatuses, and more particularly to means for operating valves at a predetermined time.

The primary object of the present invention is to construct a time controlling device of the character mentioned which is to be applied to automobiles and like motor vehicles for cutting off the supply of gasolene from the engine mounted in the vehicle at a predetermined time to prevent joy riding.

Another object of this invention is to provide a device of the class aforesaid with a casing which when locked will prevent unauthorized persons from tampering with the time controlling apparatus.

Other objects will appear hereinafter as the description continues.

With the above and other objects in view, this invention consists of the novel construction, combination, formation and arrangement of parts as will be hereinafter more fully described, claimed and particularly pointed out in the appended drawings, in which:—

Figure 1:
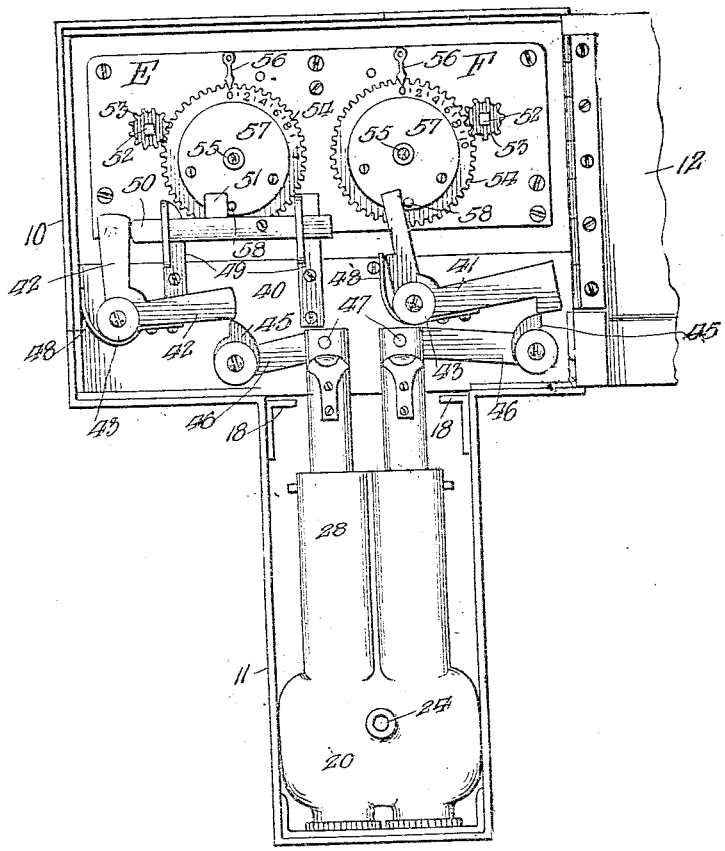
Figure 6:
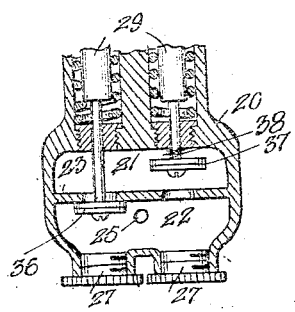
Figure 2:
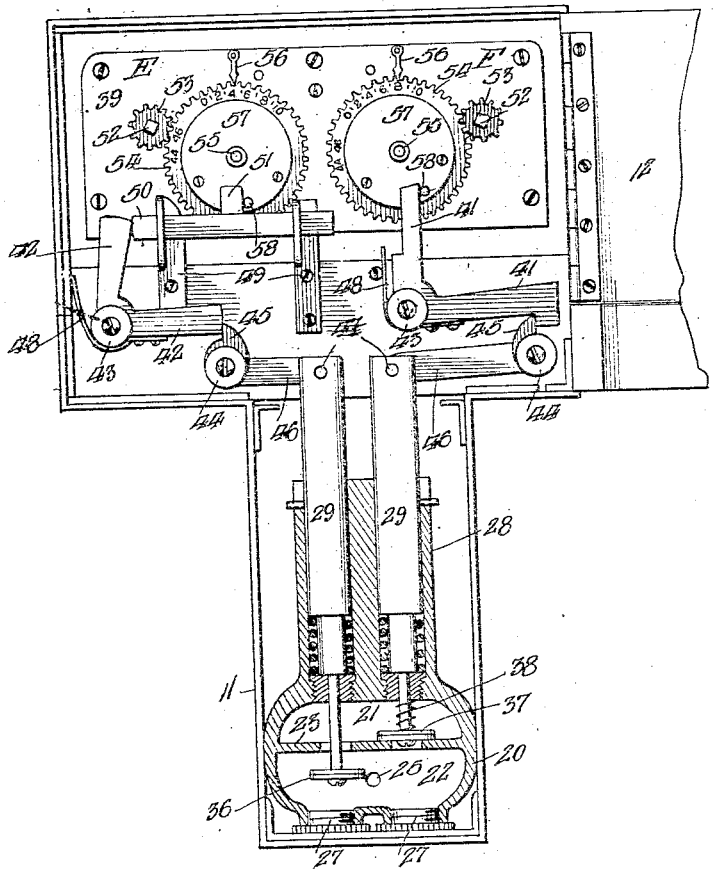
Figure 3:
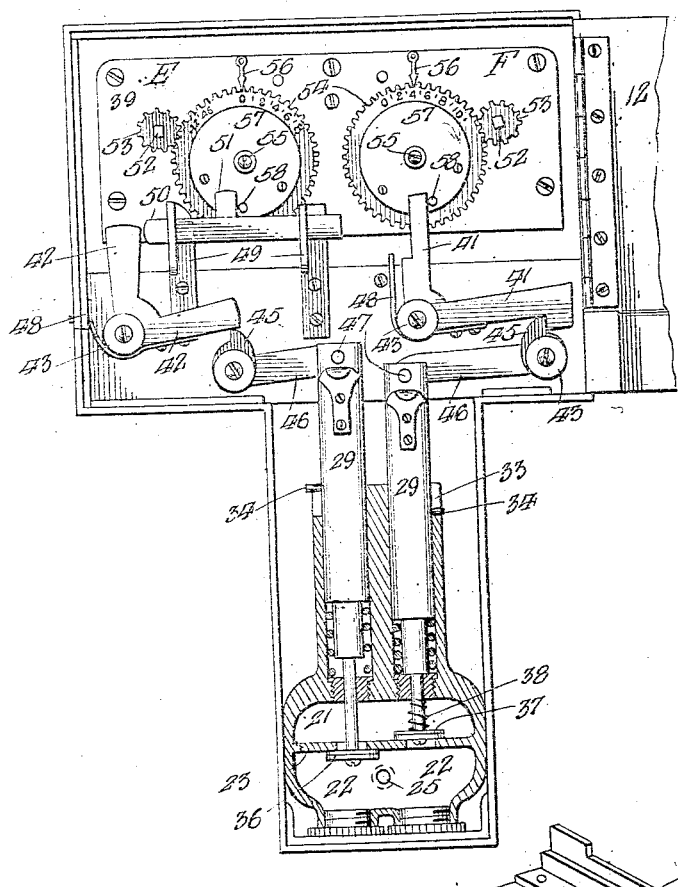
Figure 12:
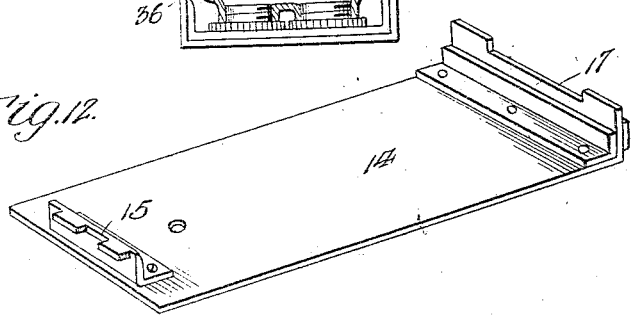
Figure 4:
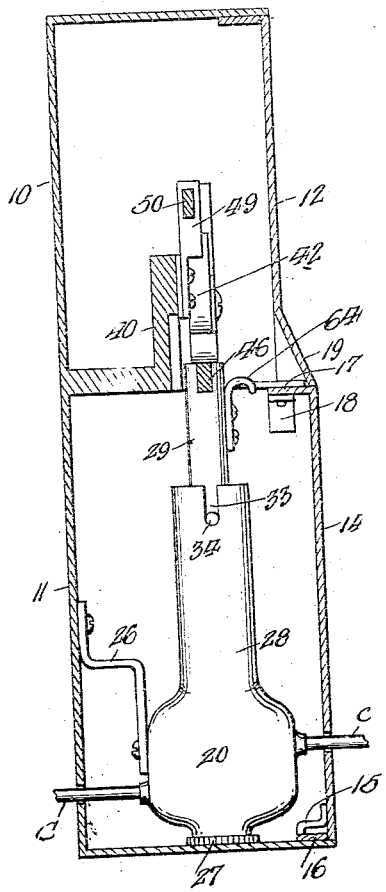
Figure 5:
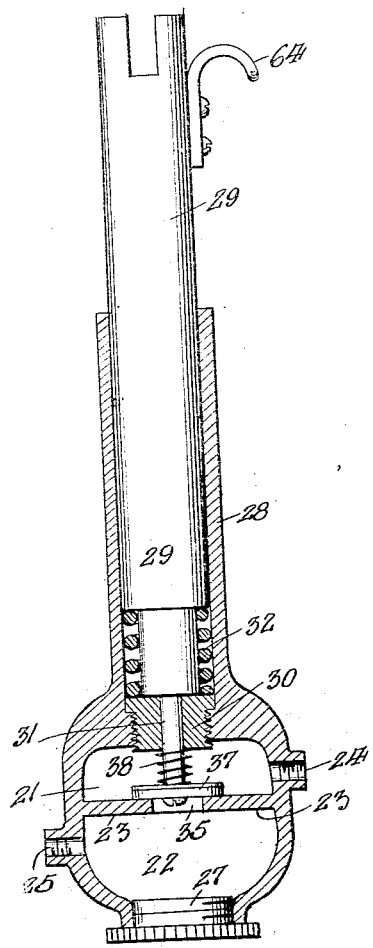
Figure 7:
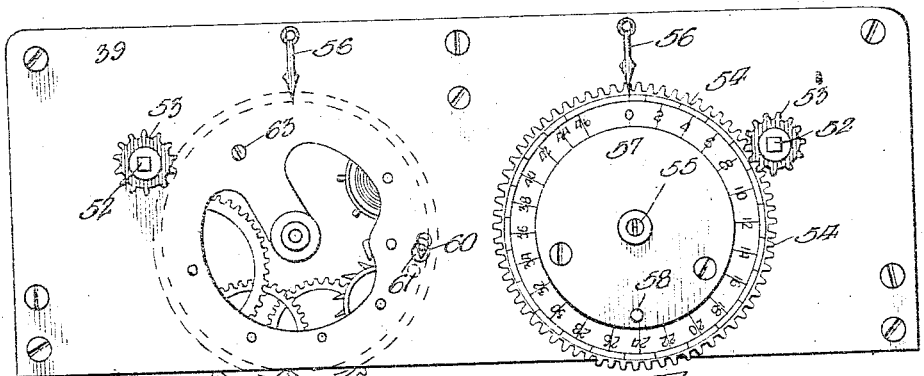
Figures 8, 9:
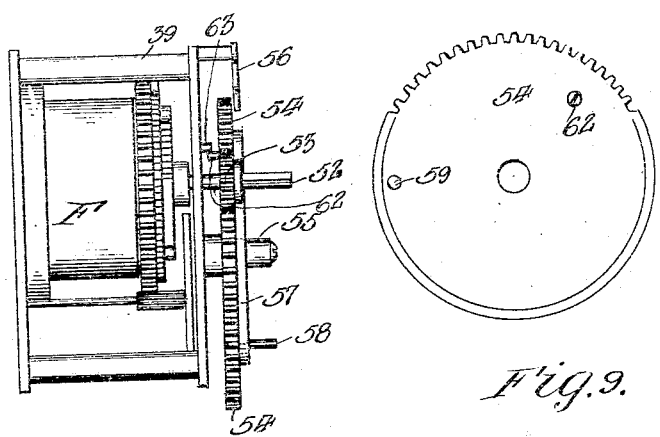

Figure 1 is a plan view of my improved time controlling mechanism as mounted within a casing and the door of the casing being opened and a portion thereof being broken away, Fig. 2 is a similar view showing the duplex valve casing in section and illustrating one of the valves in an open position, Fig. 3 is a similar view to that of Fig. 2 showing the valves in a closed position, Fig. 4 is a transverse vertical section taken through the casing showing the duplex valve in side elevation and also the time controlling motors removed therefrom, Fig. 5 is a detail sectional view of the duplex valve, Fig. 6 is a detail sectional view through the valve casing illustrating one of the valves in an open position and the other in a closed position, Fig. 7 is a plan view of the time operating motors having one of the gear wheels removed, Fig. 8 is an end elevation of the same, Fig. 9 is a bottom plan view of one of the gear wheels, Fig. 10 is a transverse section taken on the line 10—10 of Fig. 7, Fig. 11 is a perspective view of the casing in which my improved time controlling mechanism is mounted, Fig. 12 is a detail perspective view of a lid for closing the casing, and Fig. 13 is a detail side elevation of a carriage of a motor vehicle illustrating my improved invention as in use.

Reference now being had more particularly to the drawings, wherein like parts are illustrated by like references throughout the several views, the letter A indicates the frame of an automobile or other motor vehicle which is provided with an engine and which is to be supplied with gasolene. Mounted within the said frame of the vehicle is the usual supply tank B which is to supply the gasolene to the motor through the supply pipe C. Mounted preferably upon the dash board of the vehicle is my improved time controlling apparatus D which is preferably located somewhere between the supply tank and the motor of the vehicle and is provided with a valve, which will be hereinafter described, for cutting off the supply of the gasolene from the supply tank to the motor at predetermined intervals.

This improved time controlling mechanism is mounted within a casing which will shield the same so as to prevent the unauthorized tampering with or operation of the mechanism contained therein. This casing is provided with an enlarged portion 10 and a smaller depending portion 11. Mounted within the receptacle formed by the large portion of the casing is my improved time controlling mechanism and mounted within the compartment formed by the lower depending portion 11 of the casing is a duplex valve for regulating the flow of gasolene to the motor of the vehicle and which is operated by the aforesaid time controlling mechanism. The enlarged portion 10 of the casing is provided with a door 12 which has mounted therein a lock 13, whereby the contents of the casing may be concealed. The lower depending portion of the casing is provided with a removable lid 14. This lid has provided on its inner face in the lower extremity thereof a dog 15 which is adapted to rest within recesses 16 formed on the inner face of the casing and its opposite end is provided with an inwardly bent portion 17 which is at right angles to the main body portion of the lid. This inwardly bent portion 17 is adapted to rest upon brackets 18 formed within the casing and is adapted to be secured rigidly thereto by means of set screws or the like. The depending portion 11 of the casing being somewhat greater in width than the upper portion of the casing, the door and lower extremity of the upper casing is offset as at 19 so that the same may lie flush with the lower portion of the casing. It will be seen from the foregoing construction that the door 12 of the casing can only be opened when the operator has a key therefor to gain access to the interior of the casing and to remove the lower lid of the casing the door 12 will have to be first removed and it is obvious from this construction that unauthorized persons cannot gain access to the contents of the casing.

The duplex valve which is mounted in the lower casing 11 comprises a vertically extending casing 20, its lower portion being enlarged and divided into two compartments 21 and 22 by means of a partition 23. The upper compartment 21 is provided with an intake port 24 and the opposite compartment 22 is provided with an outlet port 25 and the said ports are communicated with the supply pipe C which extends from the supply tank B to the motor of the vehicle. An angular shaped brace rod 26 is mounted within the lower portion of the casing and is secured to the said duplex valve casing for holding the same in a steady position. The lower extremity of the valve casing 20 is provided with a removable plug 27, whereby access may be gained to the compartments formed in said valve and is used for cleaning purposes. Extending from the valve casing is a portion 28 having a pair of parallel recesses formed therein for the reception of the valve rods 29. These recesses formed within the upper portion 28 of the valve casing communicate with the compartment 21 formed within the valve casing and mounted within the lower portion of each of these recesses is a screw-threaded plug 30 in which the reduced portion 31 of the valve rod operates and which will also prevent the flow of liquid into the recesses formed in said casing. Mounted within each of the said recesses is a coil spring 32 which normally holds the said valve rods in a raised position and the upper extremity of the portion 28 is provided with recesses 33 in which operate pins 34 secured to said valve rods and will obviously prevent the rotation thereof.

The partition 23 mounted within the valve casing is provided with a pair of apertures 35 which form a communication between the compartments 21 and 22. It is apparent that the liquid will flow through the intake port 24, then into compartment 21 and through the apertures 35 formed within the partition mounted within said valve casing into the lower compartment 22 and then through the outlet port 25 to the engine and to provide means whereby the liquid may be cut-off I have provided a pair of valves 36 and 37, respectively, which operate upon the lower and upper faces of the partition. The valve 37 has a small coiled spring 38 mounted between the said valve and the plug 30 mounted within the valve casing.

In Fig. 3 of the drawings, I have illustrated the duplex valve as in a closed position, thereby cutting off the supply of fuel to the motor and in Figs. 5 and 6 of the drawings I have illustrated the valves in an open and closed position and to provide means whereby these valves may be independently operated I have provided a double time controlling apparatus which is mounted in the compartment formed in the enlarged portion 10 of the casing. This time controlling mechanism consists of the usual clockworks, together with improved means whereby the valves may be operated independently and at predetermined times.

This controlling mechanism is operated by a pair of spring operating motors E and F, respectively, which are mounted within a support 39. A support 40 extends within the casing and has provided thereon means for connecting the motors E and F, respectively, with the duplex valve. This means consists of a pair of angular shaped dogs 41 and 42, respectively, which are pivotally mounted at their apexes as at 43. Pivotally mounted as at 44 is a pair of pawls 45 each having extending therefrom a lever 46 pivotally mounted as at 47 in the bifurcated extremities of the valve rods 29. Each of these pawls 45 engage the extremities of the angular shaped dogs 41 and 42, respectively, when the said valve rods are held in a lowered position. Each of these dogs is provided with a leaf spring 48 for normally holding the said dogs in a lowered position. A pair of brackets 49 are mounted upon the upper face of the support 40 and have slidably mounted therein a slide 50 which is adapted to engage the extremity of one of the arms of the dog 42 and extending from its central portion is a lug 51, the purpose of which will be hereinafter described.

Extending from each of the spring motors E and F, respectively, is a stem 52, the extremity of which is squared to receive an ordinary clock winding key and mounted on each of these stems is a pinion 53 which meshes with a large gear wheel 54, each of these gear wheels being rotatably mounted as at 55 upon the upper face of the support 39. The upper face of each of the gear wheels 54 is provided with numerals running from zero to 46, the purpose of which will be hereinafter described and stationarily mounted upon the upper face of the support 39 is a pair of indicators 56 which are adapted to point to the numerals as represented upon the gear wheel. Secured to the upper face of each of the gear wheels is a disk 57 which has extending therefrom a pin 58. These pins 58 are adapted to engage the lug 51 and the extremity of one arm of the dog 41, whereby the valves may be operated. Mounted on the lower face of each of the gears 54 are lugs 59 which are adapted to engage escapement lugs 60 which are adapted to operate in slots 61 formed within the upper plate of the support 39. A lug 62 is also provided upon the lower face of each of the gears and is adapted to contact with the lug 63 mounted upon the upper plate of the support 39, which forms a double and more positive stop for the gears when the zero mark mounted on the gear registers with the indicator 56. Each of the valve stems 29 is provided adjacent its upper extremity with a knob 64, whereby the stem may be manually operated, as will be hereinafter described.

It is obvious from the foregoing description, taken in connection with the accompanying drawings, that the valves mounted within the casing may be independently operated from the before mentioned spring motors and that by rotating the gear so that the indicator 56 will register with one of the numerals as indicated on the outer face of the larger gear. It will be as many hours as the numeral which the indicator points to before the valve will be operated.

In Fig. 3 of the drawings I have illustrated the valves in a closed position, that is the motor E that operates the valve 36 has come to a stop and the pin 58 formed on the disk thereof has come into contact with the lug 51 and raised the angular shaped dog so that the spring mounted within the valve casing will be allowed to operate, thereby raising the valve stem and closing the valve and thus eliminating any possible flow of liquid into the lower compartment of the valve casing. It is to be noted that when the pins 58 have shifted the slide 50 and dog 41, that the motion of the motor is thus stopped and that such stoppage occurs simultaneously or practically simultaneously with the operation or shifting of the valves. It will be further seen by reference to the said figure that the indicator 56 registers with the numeral 4 mounted on the gear, whereby it will be four hours before the pin 58 will shift the arm of the dog 41 so that the valve 37 may be allowed to open. In other words, it will be four hours before a suitable supply of fuel will be admitted to the engine.

In Fig. 2 of the drawings I have illustrated the indicators pointing to the numerals 4 and 8, respectively, and when the valve is in the position as shown, the supply of gasolene will be admitted to the engine, but when the indicator mounted adjacent the motor E registers with zero, the valve 36 will be closed, thereby cutting off the supply of oil to the motor and reference being had to the indicator adjacent the motor F, it will be eight hours before the valve 37 will be opened to allow a suitable supply of oil to pass to the motor, thereby keeping the valves closed for a period of four hours.

It is to be understood further that whereas I have shown a specific embodiment of my present invention, that other minor details of construction, formation and arrangement of parts may be resorted to that come within the scope of the appended claims without departing from the spirit of the present invention.

Having thus fully described my invention, what I claim as new and desire to secure by Letters Patent, is:—

1. In a time controlling apparatus having two communicating chambers, a plurality of ports leading from one chamber to the other, valves, one for each port, separate time controlled means for each of said valves, means for operating each valve independently co-operating with said controlled means, said valves thereby being independently controlled at all times during actuation, one of said chambers having an inlet port and the other of said chambers having an outlet port, said construction rendering either valve capable of actuation after actuation or operation of the other valve.

2. In a time controlling apparatus, a casing, a partition in said casing providing chambers, one on each side thereof, inlet means to one of said chambers, outlet means from the other of said chambers, said partition having valve openings therein, valves for said openings, means to operate said valves separately and independently, and means to stop operation of said latter means.

3. In a time controlling apparatus, the combination of a casing provided with a partition to form a plurality of chambers, one chamber on each of the sides thereof, one of said chambers having an inlet port and the other of said chambers having an outlet port, said partition having valve openings therein, valves for said openings, one valve being in each chamber, motors, one motor for each valve, a separate mechanism to control the operation of each valve from its motor, each mechanism having parts operable to permit shifting of the valve, said mechanisms being operable independently whereby the valves are operable independently and one valve may shift after shifting of the other valve.

4. In a time controlling apparatus, the combination of a pair of motors, a valve casing, valves mounted within said casing, means connecting said motors with said valves, a partition dividing said valve casing into compartments, said compartments communicating, the said valves adapted to close said compartments, and means for independently operating the said valves one from each motor, substantially as described.

5. In a device of the class described, the combination of a time controlling means, a valve casing, a pair of valves mounted within said casing, a partition for dividing said casing into compartments, said partition having apertures formed therein, the said valves adapted to operate on the inner and outer faces of said partition, and means for operating the said valves independently, substantially as described.

6. In a time controlling apparatus, the combination of a casing, a pair of spring controlled motors mounted therein a valve casing mounted adjacent said motors, valves mounted within said casing, a partition dividing said casing into compartments, one of said compartments having an intake port, the opposite compartment having an outlet port, means communicating said compartments, and means for independently operating said valves. whereby the communication between said compartments may be cut off.

7. In time controlling apparatus, the combination of a casing, communicating compartments in said casing, one of said compartments provided with an outlet port and the other of said compartments provided with an inlet port, a valve operable to cut off communication between said compartments, said valve having a stem, a lever pivoted to said stem, a pivotally mounted pawl connected to said lever, a spring controlled dog in operative relation with said pawl, a motor, a member rotatable by said motor, and a projecting member on said rotatable member to cause pivotal movement of said dog upon rotation of said rotatable member for the purpose specified.

8. In a time controlled apparatus, the casing provided with communicating compartments, one of said compartments provided with an inlet port and the other of said compartments provided with an outlet port, a valve operable to cut off communication between said compartments having a stem, a lever pivoted to said stem, a pivoted pawl connected to said lever, a pivoted dog in operative relation with said pawl, a spring operatively associated with said dog, a slidable member operable to shift said dog, a motor, a rotatable member operated by said motor having a projection to engage said slidable member upon rotation of the rotatable member, to thereby shift said slidable member and said dog to permit shifting of said pawl, lever, valve.

9. In a time controlling apparatus provided with communicating compartments, one of said compartments provided with an inlet port and the other of said compartments provided with an outlet port, a partition device between said compartments provided with openings therethrough, valves to close said openings movable in opposite directions, springs operatively associated with said valves, levers pivoted to said valves, pawls operatively associated with said levers, spring control dogs operatively associated with said pawls, a plurality of independently rotatable members each having a projection, one of said projections adapted to engage one of said dogs, a slidable member, the other of said projections adapted to engage said slidable member, said slidable member in turn adapted to engage the other of said dogs.

10. In a device of the class described, the combination of a motor, time controlling means operated by said motor, a valve, a valve stem extending from said valve, a pivotally mounted pawl lying adjacent said valve stem, a lever connecting said valve stem with said pawl, a spring pressed dog connecting said pawl with said time controlling means, and means for releasing said dog to permit shifting of the valve.

11. In a device of the class described, the combination of a casing, a spring motor mounted within said casing, a disk rotated by said motor, a slidable shifting member, projections, one of said projections carried by said disk and one of said projections carried by said shifting member, said projections adapted to engage to slide the shifting member through movement of the disk, a valve, a dog shiftable upon sliding movement of the shifting member, said dog co-operating with said valve, said valve movable upon shifting of the dog.

HENRY R. JAEKEL.

Witnesses:
STEPHEN D. LAPPINE,
JACOB ESSWEIN, Jr.